Sept. 29, 1959   D. B. DOOLITTLE ET AL   2,906,475
LINEARIZED ENGINE FOR AIRCRAFT CATAPULT
Filed March 22, 1957   16 Sheets-Sheet 1

INVENTORS
Donald B. Doolittle
and Sammie G. Heahey
BY
ATTORNEY

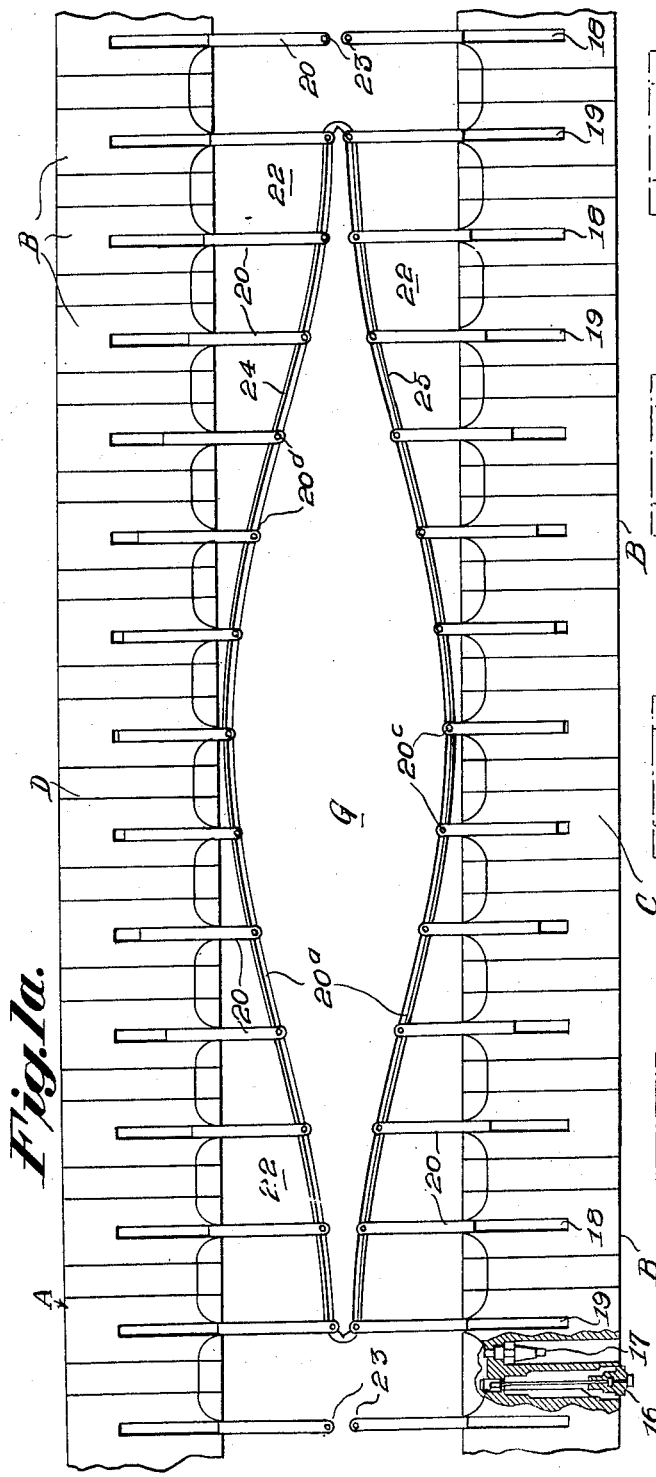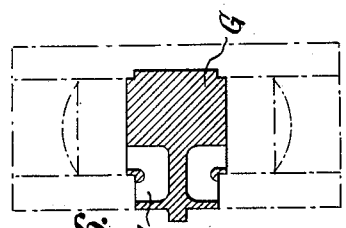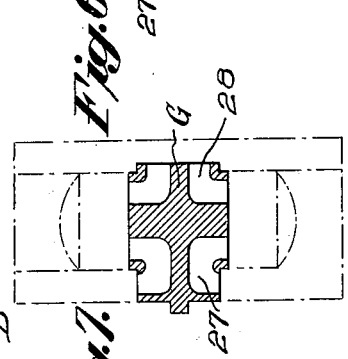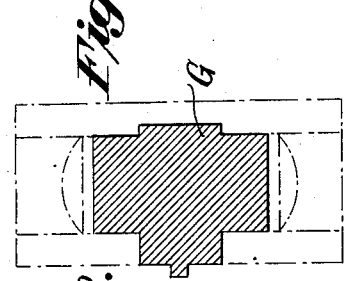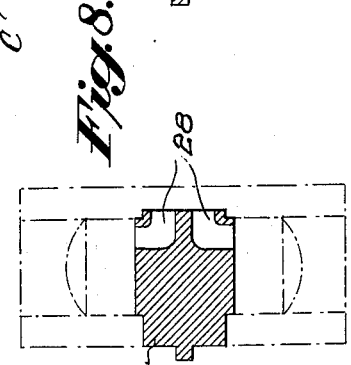

Sept. 29, 1959   D. B. DOOLITTLE ET AL   2,906,475
LINEARIZED ENGINE FOR AIRCRAFT CATAPULT
Filed March 22, 1957   16 Sheets-Sheet 3
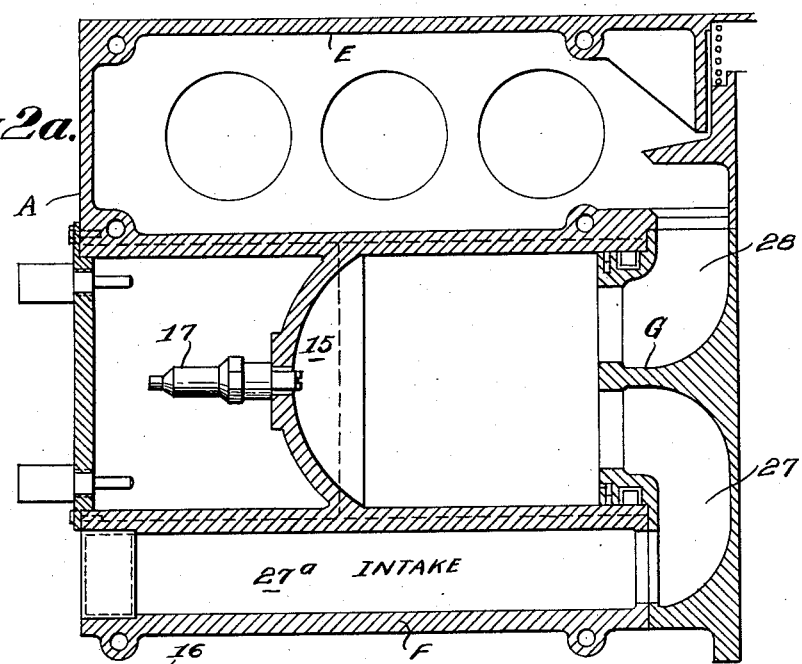
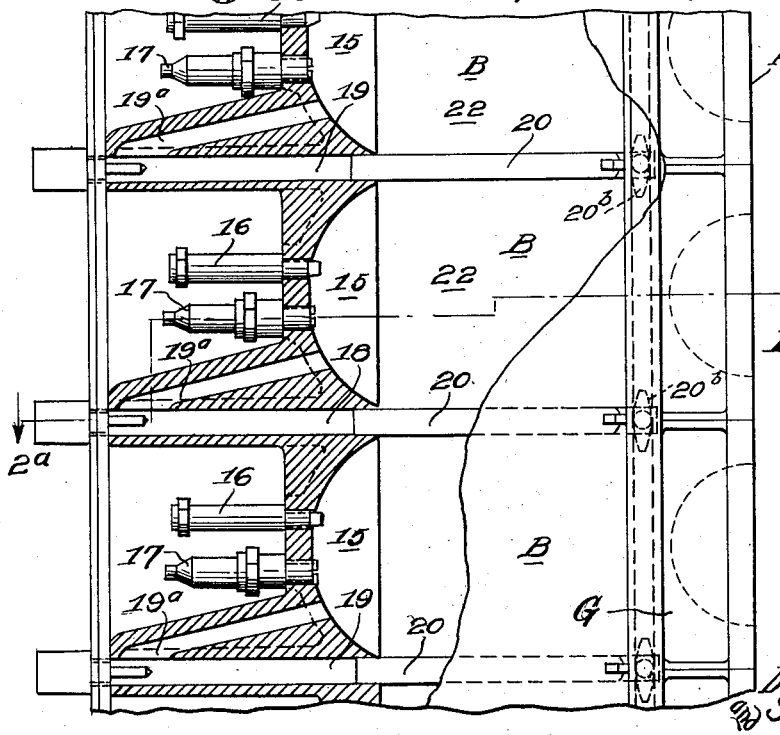
INVENTORS
Donald B. Doolittle
Sammie G. Keahey
BY
Herbert M. Birch
ATTORNEY Sept. 29, 1959  D. B. DOOLITTLE ET AL  2,906,475
LINEARIZED ENGINE FOR AIRCRAFT CATAPULT
Filed March 22, 1957  16 Sheets-Sheet 4
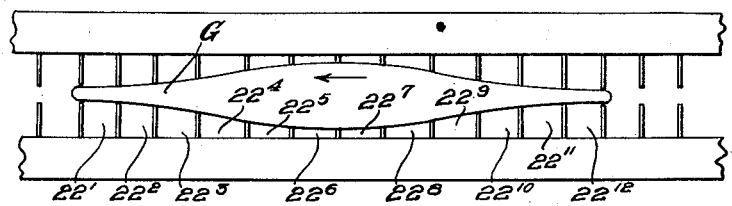
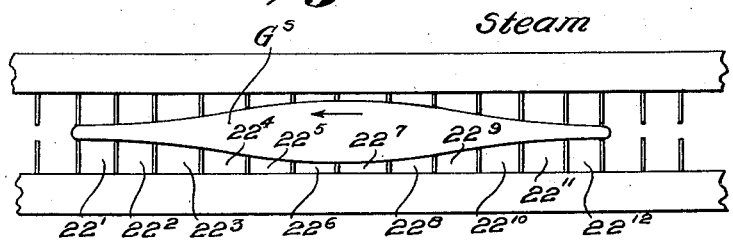
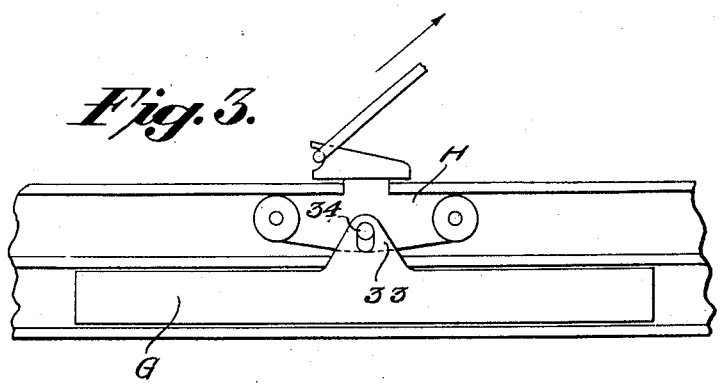
INVENTORS
Donald B. Doolittle
and Sammie G. Keahey.
BY
ATTORNEY Sept. 29, 1959 D. B. DOOLITTLE ET AL 2,906,475
LINEARIZED ENGINE FOR AIRCRAFT CATAPULT
Filed March 22, 1957 16 Sheets-Sheet 5

INVENTORS
Donald B. Doolittle
Sammie G. Keahey
BY
Herbert M. Birch
ATTORNEY

Sept. 29, 1959     D. B. DOOLITTLE ET AL     2,906,475
LINEARIZED ENGINE FOR AIRCRAFT CATAPULT
Filed March 22, 1957     16 Sheets-Sheet 6
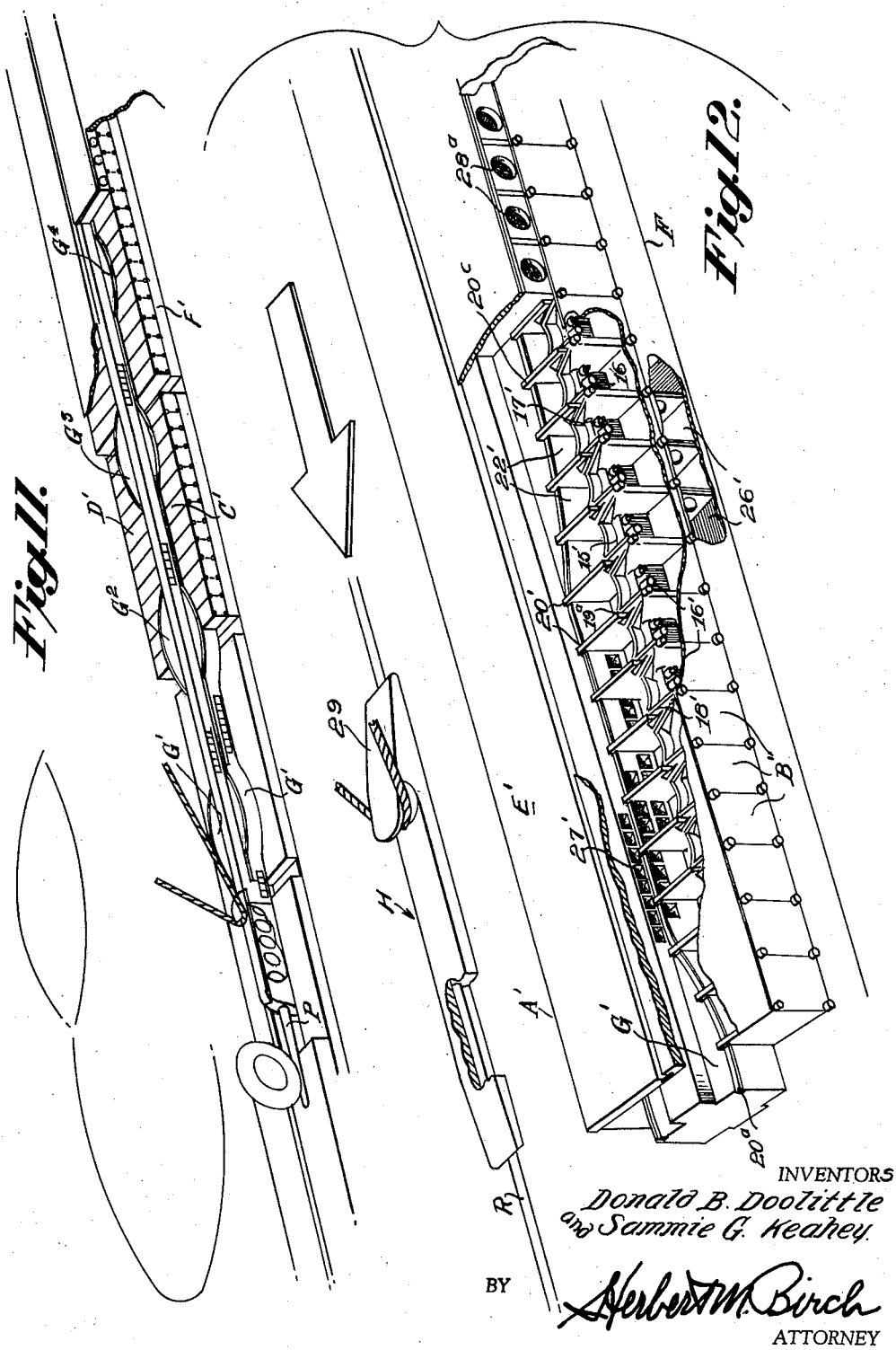

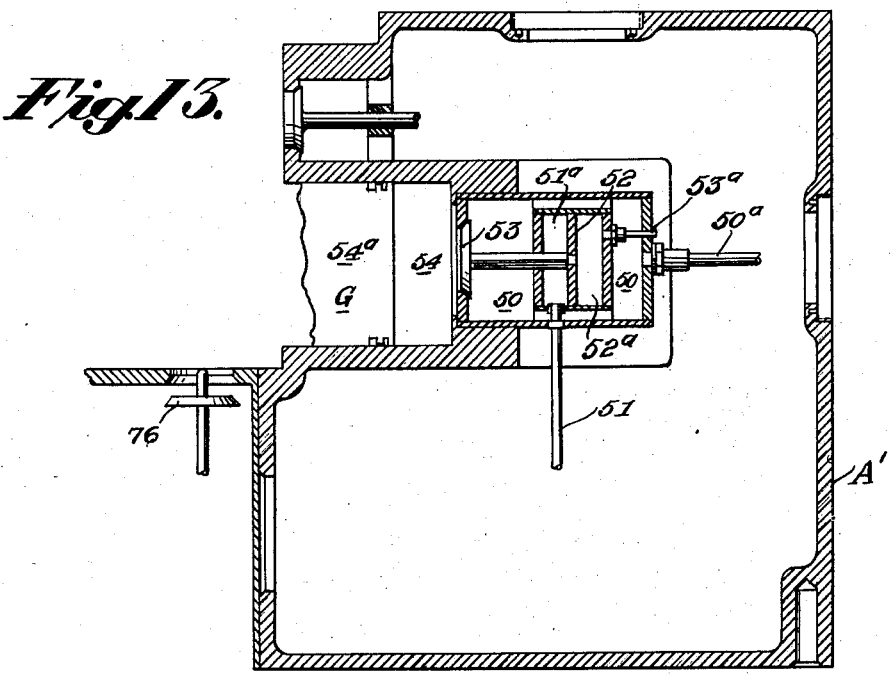
Fig 13.
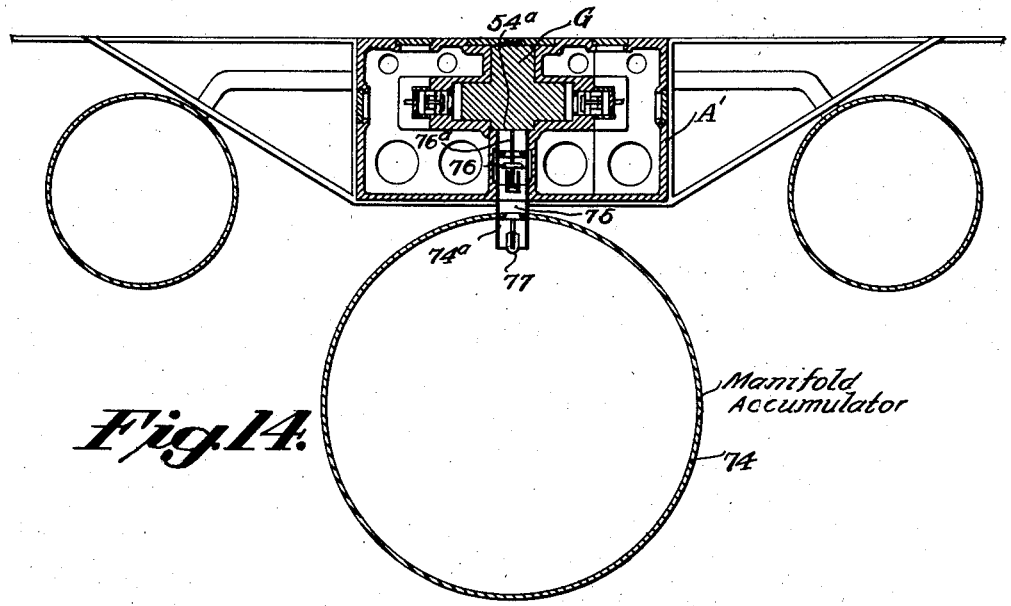
Fig 14.
INVENTORS
Donald B. Doolittle
and Sammie G. Keahey.
BY 
ATTORNEY

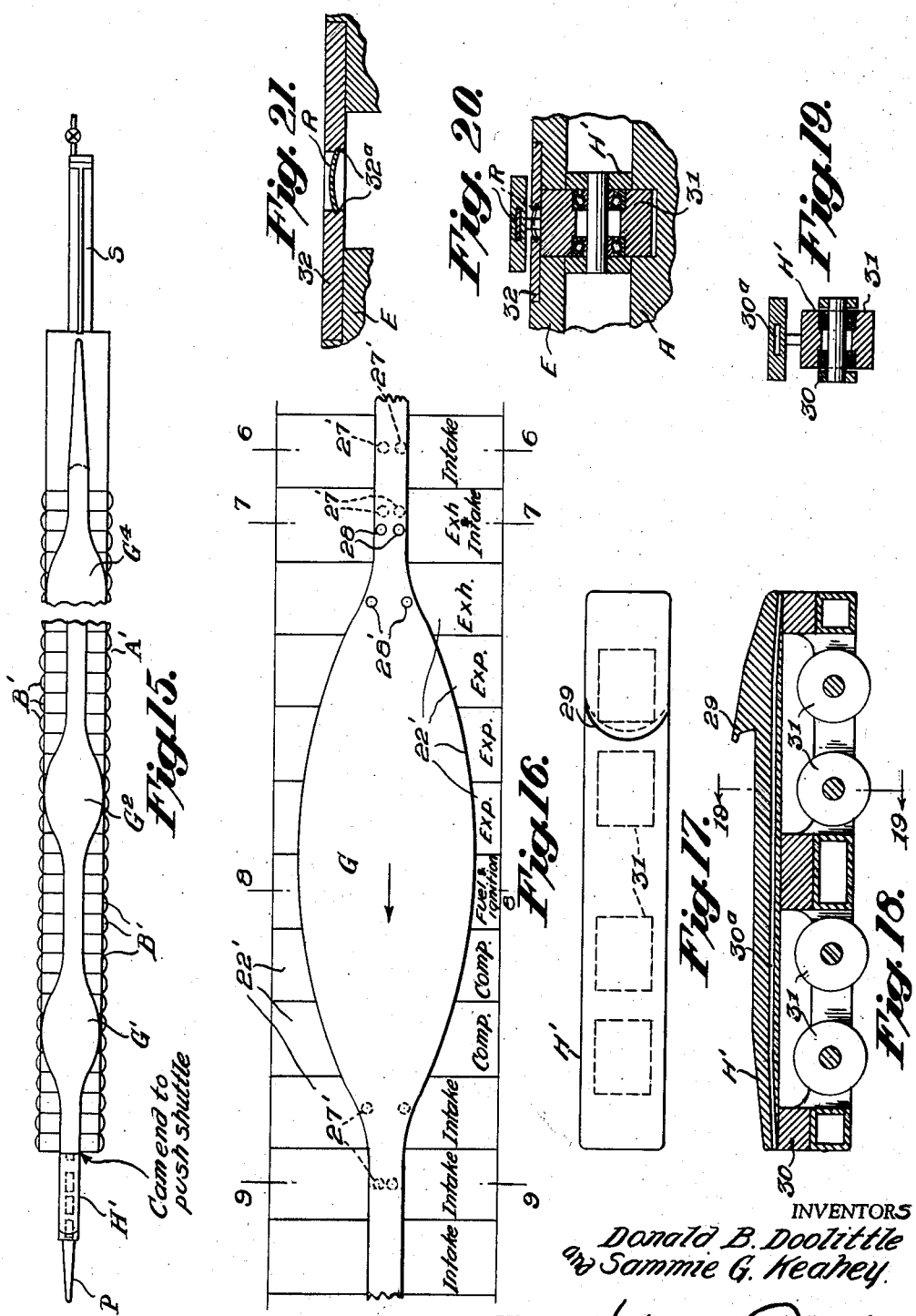

Sept. 29, 1959   D. B. DOOLITTLE ET AL   2,906,475
LINEARIZED ENGINE FOR AIRCRAFT CATAPULT
Filed March 22, 1957   16 Sheets-Sheet 9

*Fig. 22.*

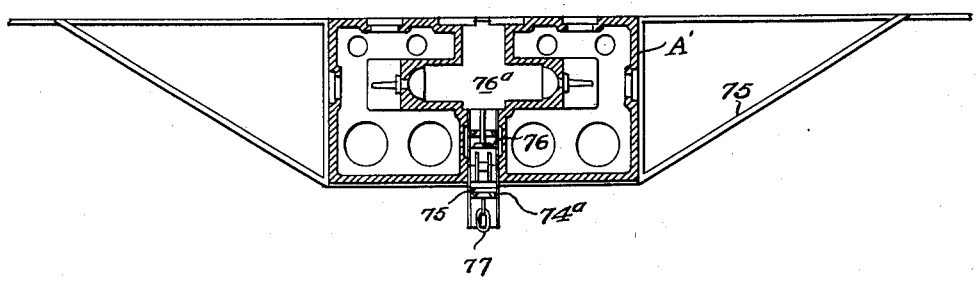

*Fig. 23.*

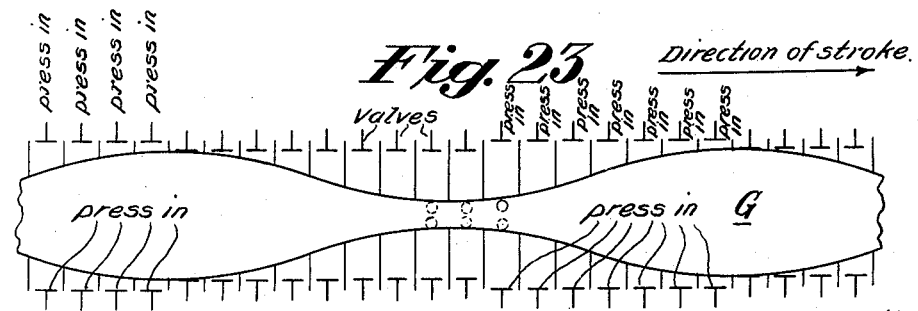

Starting operation— For the starting operation, the configuration of the cam is used to accelerate the cam by use of a compressed air source in the same manner as it is accelerated by the internal combustion and steam. The valves controlling the compressed air are timed and operated by a pilot valve actuated by the cam.

*Fig. 24.*

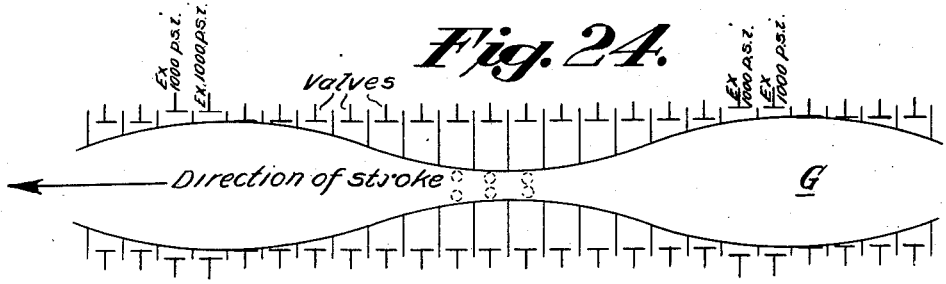

Braking Operation— For the braking operation, the configuration of the cam is used to compress the air on the forward side of the cam to a predetermined pressure. The relief valve is forced open when this pressure exceeds the selected pressure on the opposite face of the valve, thus discharging the pressure into the accumulator line. As the cam continues in motion the inlet ports allow air under pressure to enter the cylinders and be compressed as above. The exhaust ports are held closed by a manually operated valve during this operation.

INVENTORS
Donald B. Doolittle
Sammie G. Keahey.
BY
Herbert M. Birch
ATTORNEY

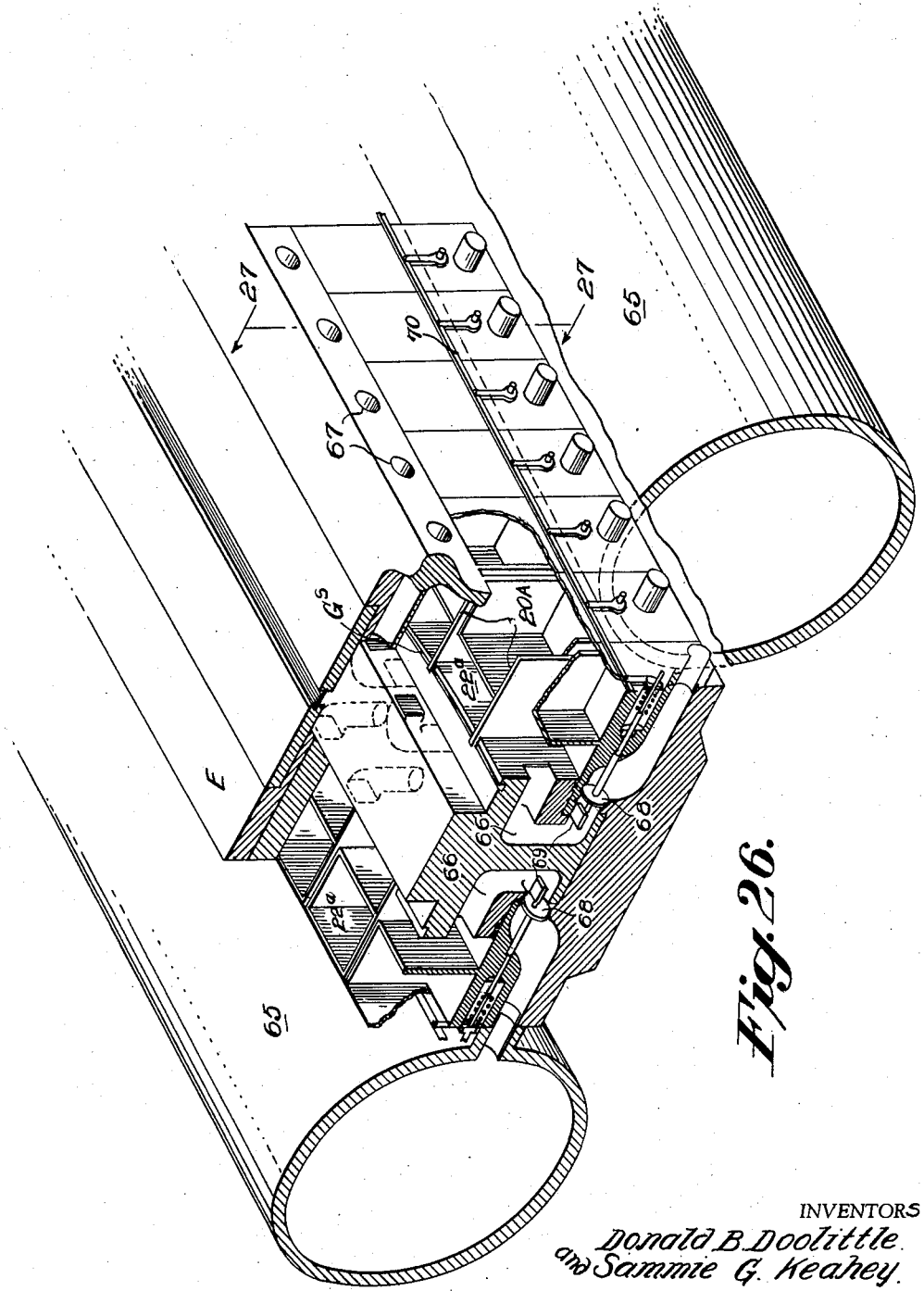

Sept. 29, 1959  D. B. DOOLITTLE ET AL  2,906,475
LINEARIZED ENGINE FOR AIRCRAFT CATAPULT
Filed March 22, 1957  16 Sheets-Sheet 12
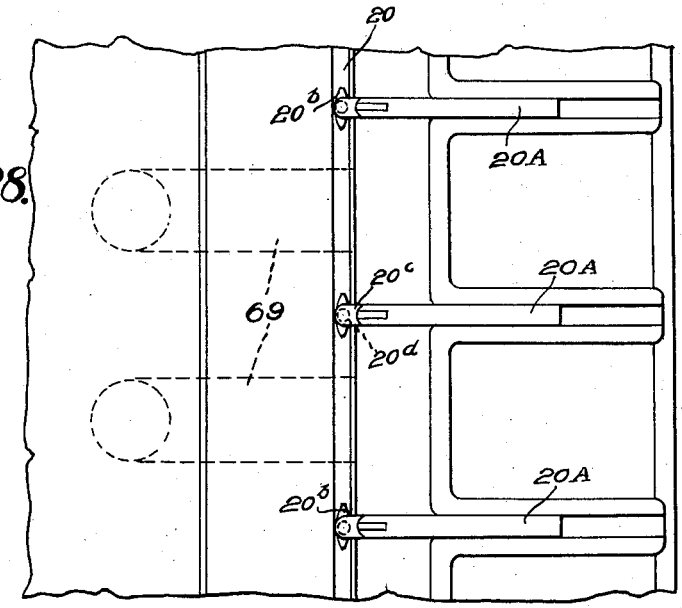
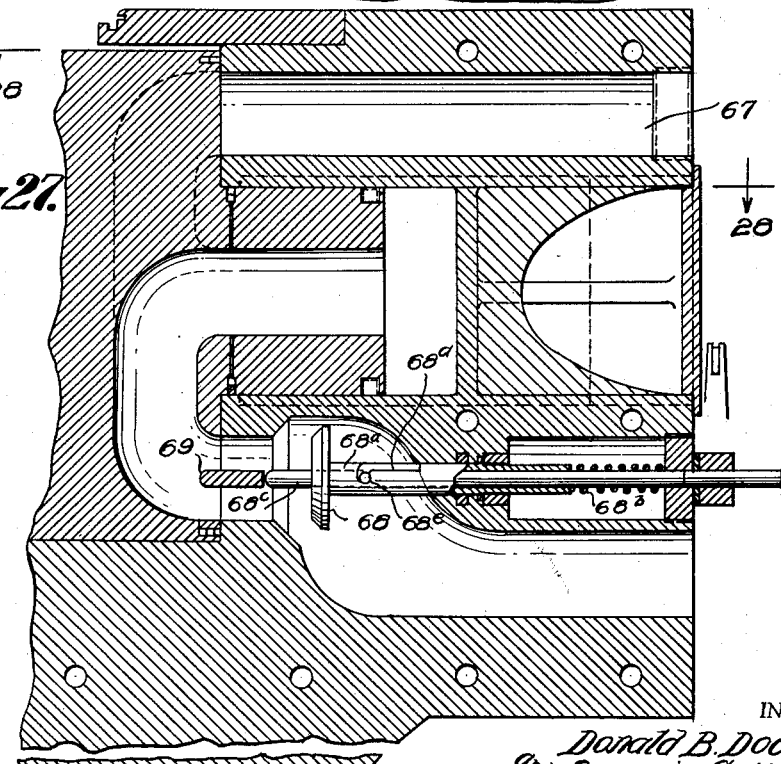
INVENTORS
Donald B. Doolittle
Sammie G. Keahey
BY Herbert M. Birch
ATTORNEY

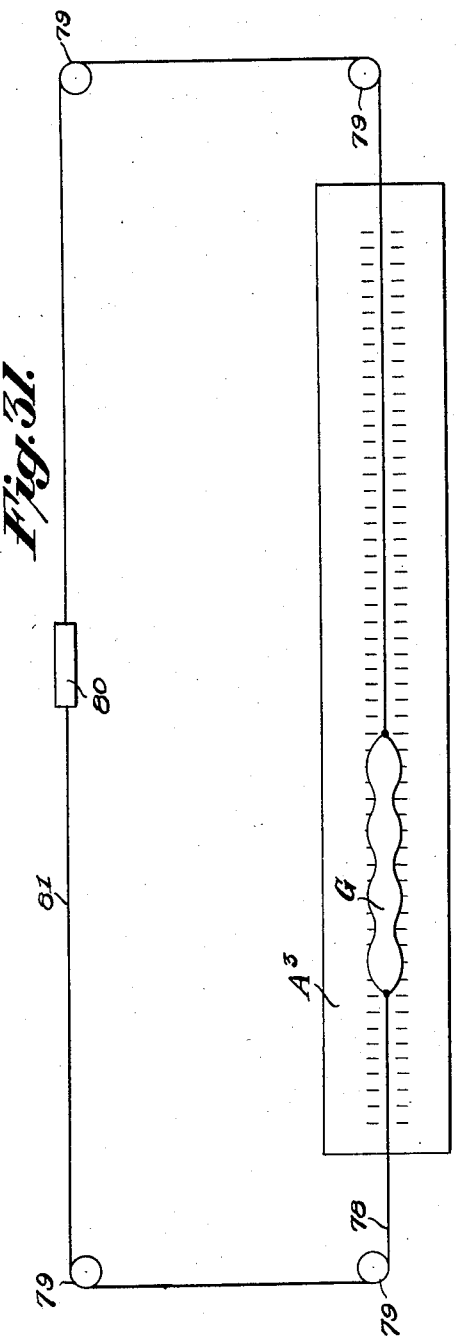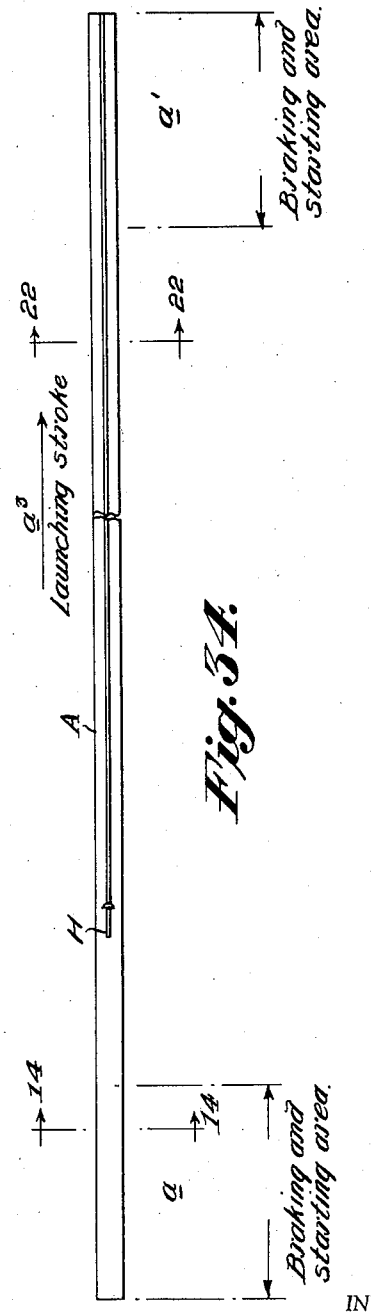

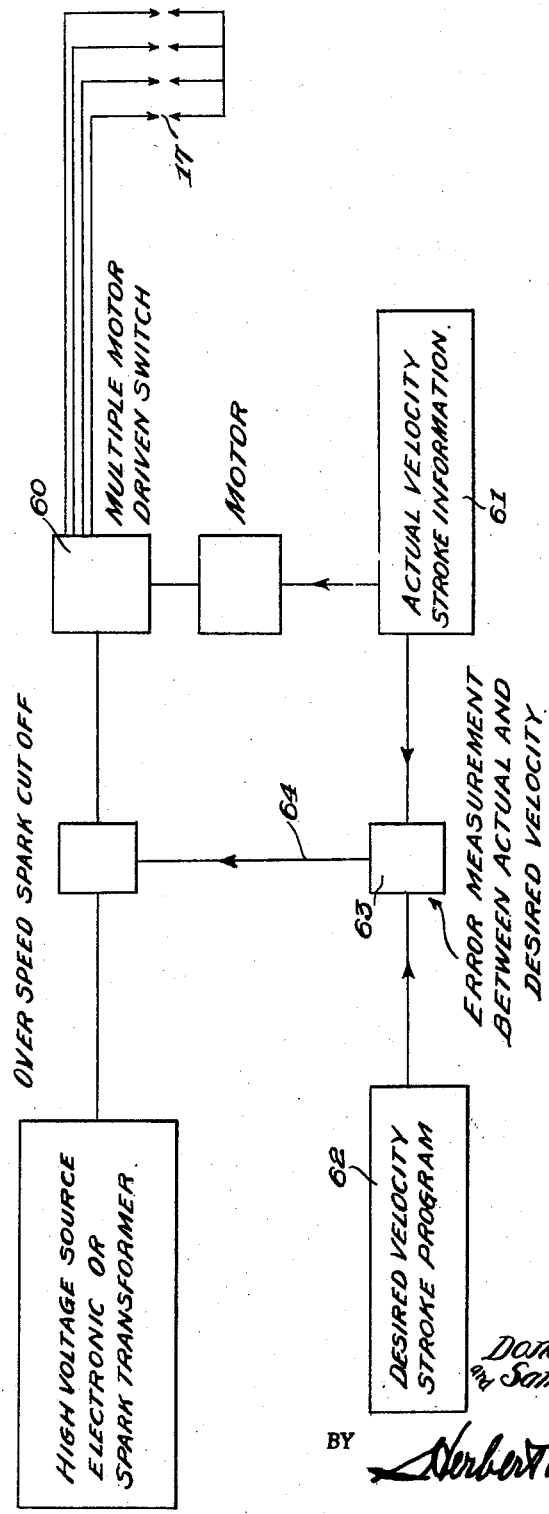

United States Patent Office 2,906,475
Patented Sept. 29, 1959

2,906,475

LINEARIZED ENGINE FOR AIRCRAFT CATAPULT

Donald B. Doolittle, Wilmington, and Sammie G. Keahey, Newark, Del.

Application March 22, 1957, Serial No. 648,486

28 Claims. (Cl. 244—63)

The present invention relates generally to a linearized engine of the compression and expansible chamber type adapted to be powered with expansible power medium, such as developed from internal combustion, steam, or compressed air, including means driven by said expansion of the power medium used. As an example, the driven means may be a cam to which the power of the expanding medium is transferred and the cam may in turn impart the power to a driven member to accomplish work.

One specific object of the present invention is to provide a novel system for launching aircraft.

It is another object of the invention to provide a novel combination of expansible chamber forming elements, such as moving vanes adapted to form the side walls of the expansible chambers, which walls are movable laterally by the opposed curved surfaces of an eliptical or almond shaped cam traversable along a linear path.

Another object is to so arrange and so proportion the vanes, the expansible chambers formed thereby, and the contours of the cam as to have expanding pressures developed from combustion, steam or compressed fluids and to act directly on the cam surfaces, thus eliminating the need of heavily loaded cam followers.

Another object is to so arrange and proportion the vanes and valving that the expansible medium may be used to assist in actuation of the vanes and thereby reduce the loading between the vanes and the cam.

Thus the thrust imparted to the cam by the power medium expanding in the movable walled chambers is developed by the differential in pressure on the respective opposed curved forward and opposed curved aft portions or faces of the cam. For example, as the cam is moved linearly, the chamber walls opposite the respective opposed curved faces of the forward portion of the cam are forced to retract into the body of the housing in which they are mounted, thus reducing the volume of the chambers toward the progressively higher portions of the respectively opposed curved cam faces and compressing the air in the chambers. When the center or high point cam faces are reached the power medium, such as steam, or compressed air is injected or a compressed charge of fuel and air is ignited to produce a relatively high pressure in the chambers on the respectively opposed curved aft faces of the cam, to thereby provide the thrust as will be described hereinafter in detail with reference to the drawings.

Another object is to provide for favorable thrust performance characteristics of a linear type catapult, based on a given brake mean effective pressure (B.M.E.P.), the depth and the stroke of the chamber, and the number of cycles or cam sections employed.

A still further object is to provide a housing with a centrally positioned shuttle track above the cam or cam sections in the housing, and to further provide a novel shuttle for the track which is engageable by the cam or connected thereto to drive the same for aircraft launching operations.

Still a further object is to provide a novel housing for the present novel engine, whereby the same may be made in a unit building block system in which each portion thereof may be made up of a machine casting or weldment containing all the parts, valves and mechanism necessary for one chamber, so that a series of these components may be fastened together for whatever length is desired. Such arrangement of components makes it possible to apply mass production techniques in manufacture of such engines to provide for economy.

Yet another object is to provide a catapult comprising a linearized supercharged two-cycle engine utilizing cams and vanes in lieu of pistons and cylinders.

A still further object is to provide an air and fuel charging system in combination with a system for supplying additional air under high pressure, to thereby supercharge the engine, and wherein the combination of valving, supercharging pressure, expansion ratios and type of cycle may be arranged to provide maximum power and efficiency.

Yet still a further object is to so arrange the valving that the engine be used to absorb high energies, such as to arrest high speed objects, such as an arresting gear for aircraft.

With these and other objects in view which will become apparent as the invention is fully understood, the same resides in the novelty of construction, combination and arrangement of elements hereinafter described in detail and distinctly set forth in the appended claims.

The description should be read in conjunction with the accompanying drawings, wherein:

Figure 1 is a broken perspective view partly in section of a single cycle engine;

Figure 1a discloses a single cycle or single cam linear engine in a plan view thereof with the shuttle and shuttle track removed to expose the movable vanes, chambers, fuel and ignition and cam with its vane connections;

Figure 2 is an enlarged top plan and longitudinal section of a few of the assembled internal combustion engine components, which when coupled together form the engine housing;

Figure 2a is a transverse sectional view on section line 2a—2a of Figure 2, showing several of the components joined together;

Figure 10:
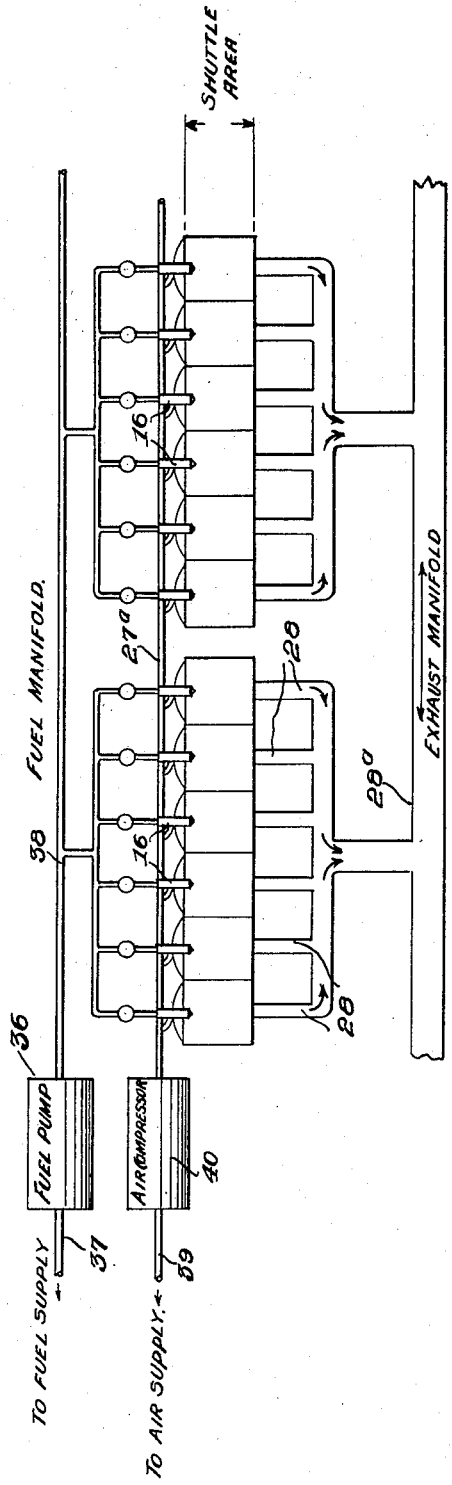
Figure 29:
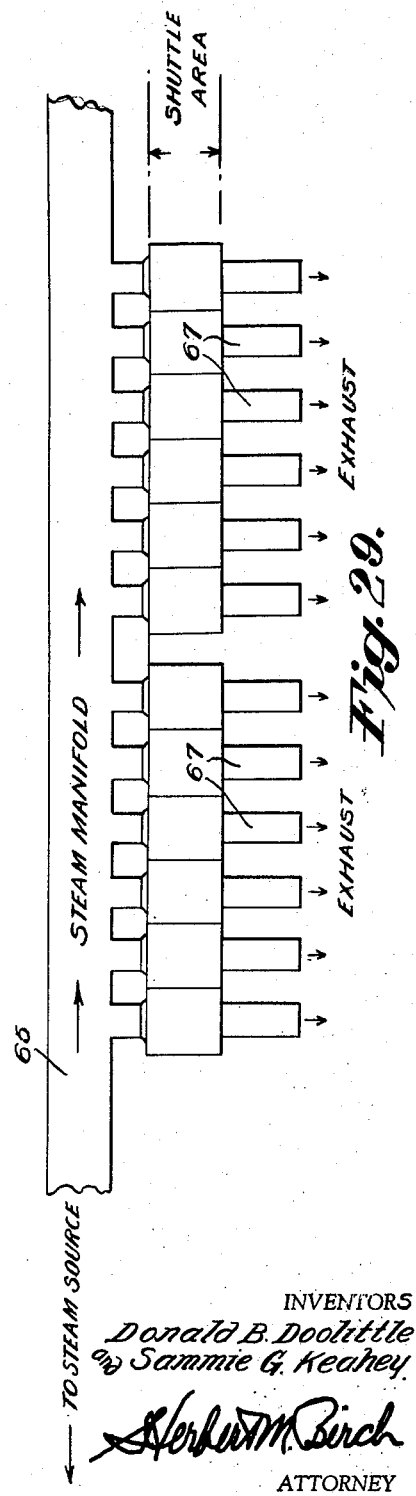
Figure 25:
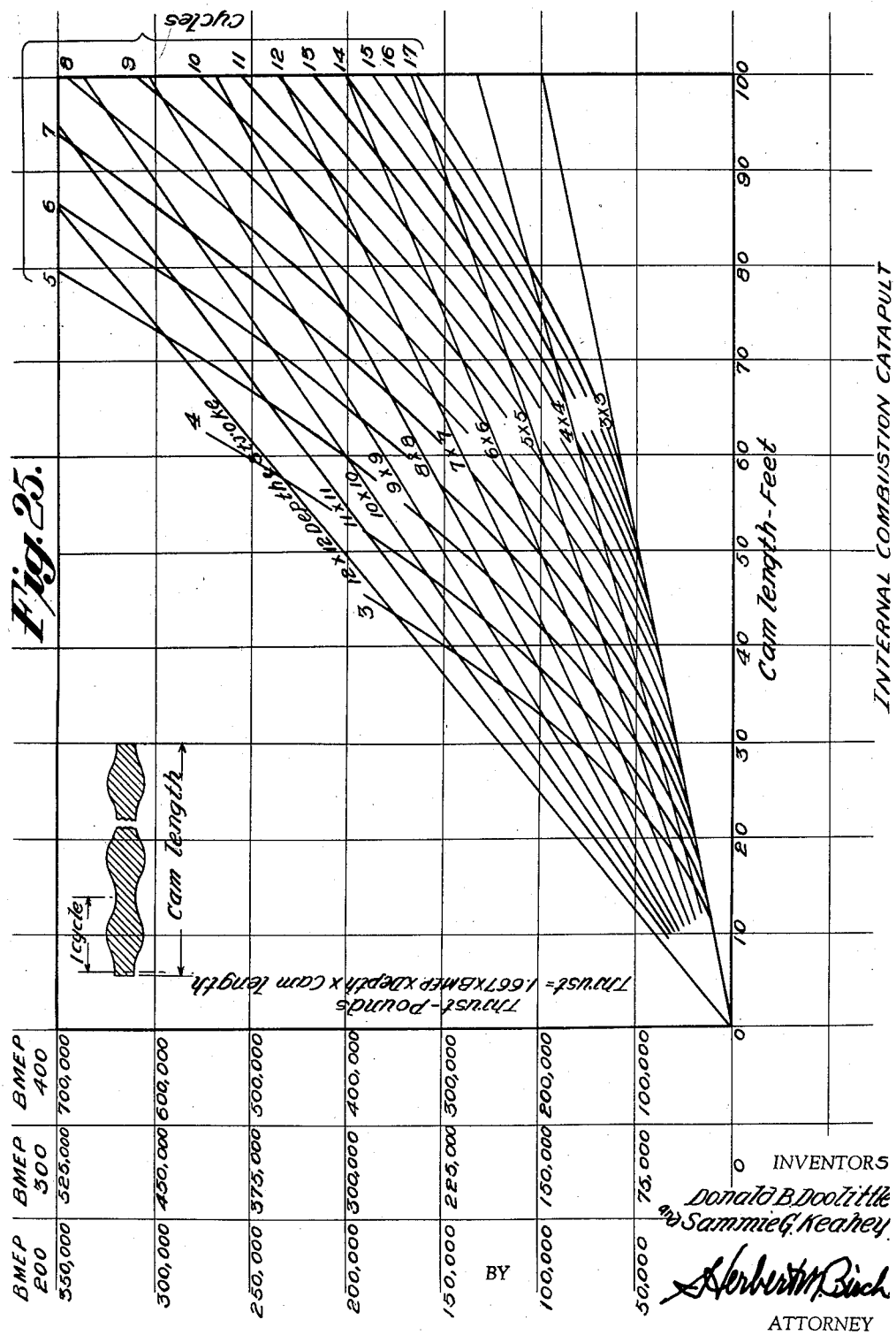
Figure 30:
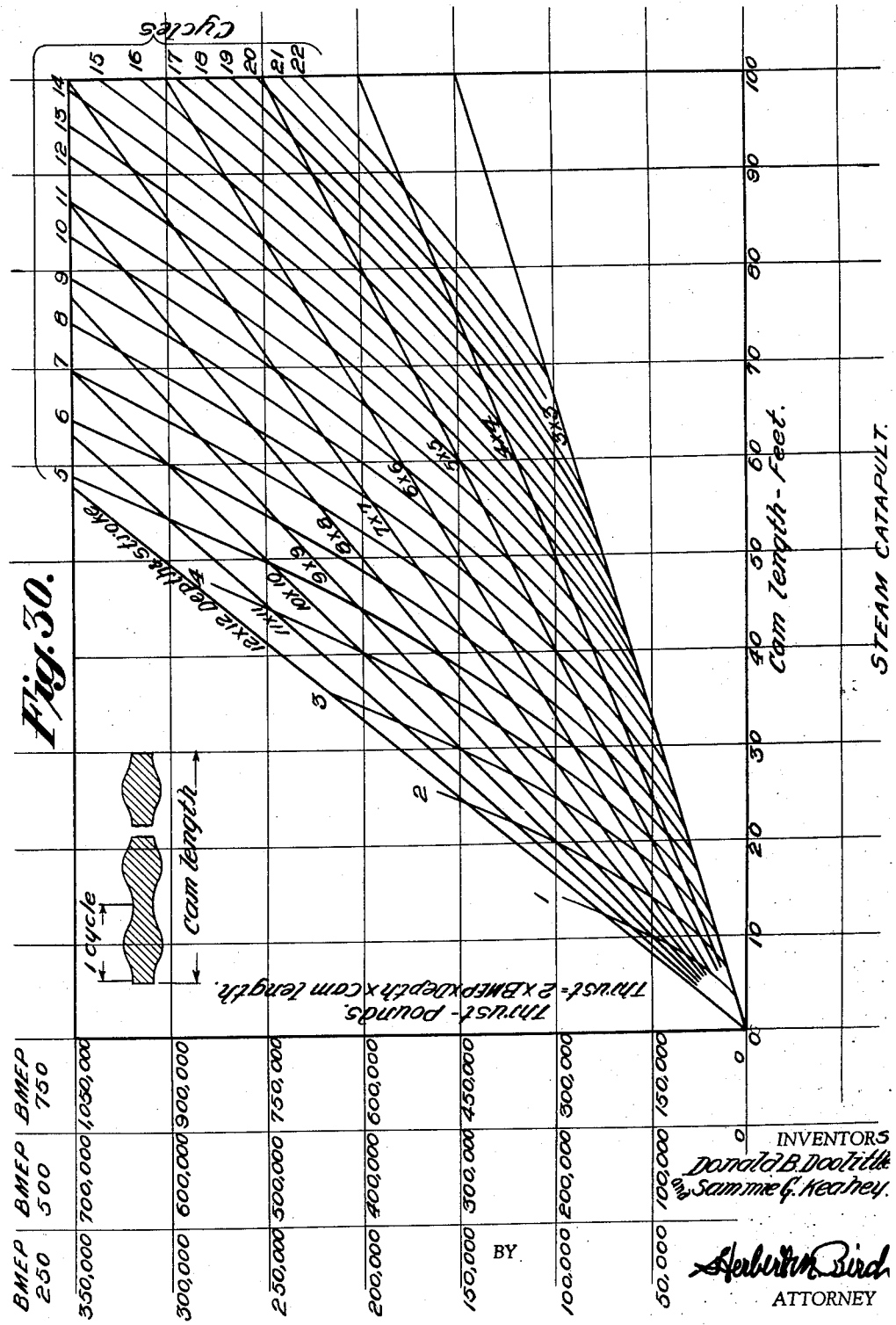
Figure 32:
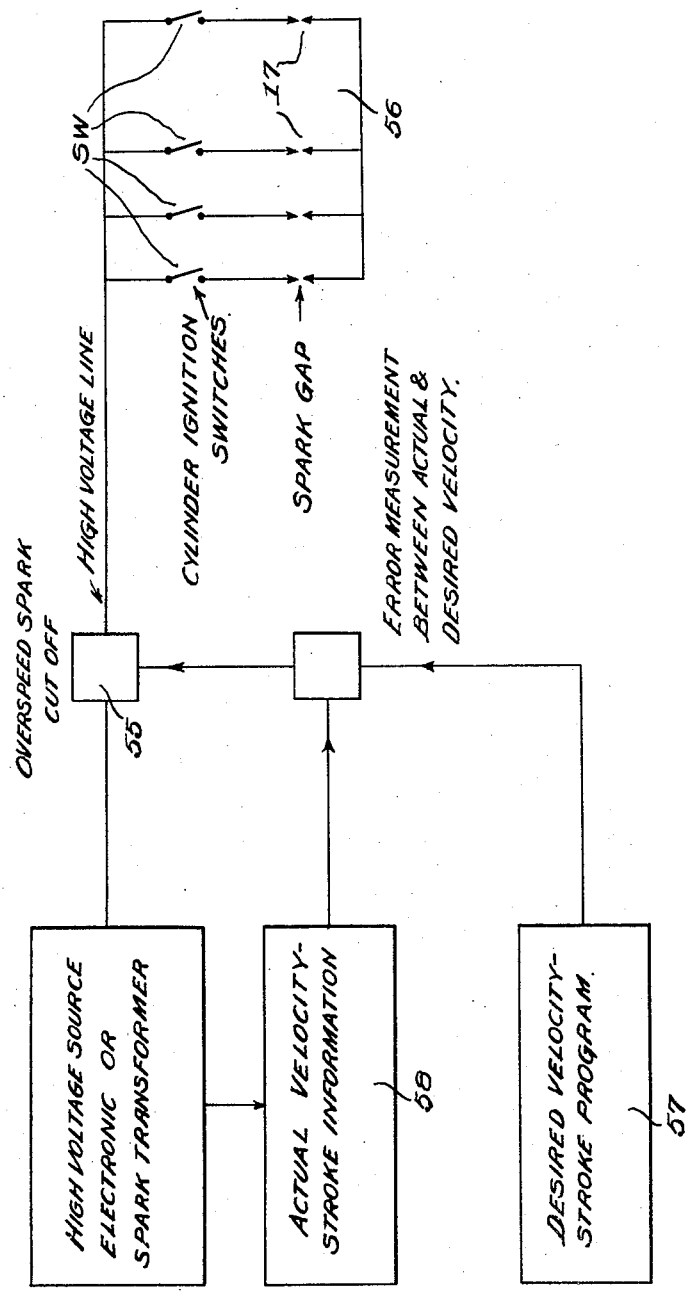

Figure 3 discloses a detail of one arrangement for connecting a shuttle with the bridle hook to the drive cam traversable below the same in the chambered power housing of Figures 1 and 1a;

Figures 4 and 5 are diagrammatic illustrations of the operation of an internal combustion cycle and of a steam power cycle, respectively;

Figure 6 is a view taken on section line 6—6 of Figure 16;

Figure 7 is a view taken on section line 7—7 of Figure 16;

Figure 8 is a section view taken on section line 8—8 of Figure 16;

Figure 9 is a view taken on the section line 9—9 of Figure 16;

Figure 10 is a diagrammatic representation of a fuel and air supply system with the exhaust manifold arrangement from the chambers on each side of the cam means;

Figure 11 is a cut away perspective view of a second embodiment of the invention with the shuttle in position for towing an aircraft;

Figure 12 is an enlarged view of a cut away portion of Figure 11 with the shuttle pulled apart to uncover the expansion chambers and associated working elements thereof;

Figure 13 is a cross section view of the starting end of the engine;

Figure 14 is a further cross section view of the braking and starting area as observed in the plane of line 14—14 in Figure 34;

Figure 15 is a diagrammatic top view of the engine showing the shuttle, tandem cams, side expansion chambers, braking probe and a starter mechanism;

Figure 16 is a diagrammatic plan view of a cam and indicating in particular the disposition of the intake and exhaust valves;

Figure 17 is a top plan view of the shuttle in accordance with a satisfactory structural embodiment thereof;

Figure 18 is a vertical longitudinal section of the shuttle;

Figure 19 is a vertical section in the plane of line 19—19 of Figure 18;

Figure 20 is a transverse sectional view showing the shuttle in the cam housing;

Figure 21 is a transverse section showing the disposition of the track slot sealing strip;

Figure 22 is a cross section view taken of the stroke area of the engine as observed in the plane of line 22—22 on Figure 34;

Figure 23 is a diagrammatic illustration of the starting operation;

Figure 24 is a diagrammatic illustration of the braking operation;

Figure 25 is a graphic illustration of the performance characteristics of the second embodiment of the invention;

Figure 26 is a third embodiment of the invention illustrating in cutaway perspective a cam and vane steam type engine;

Figure 27 is a vertical transverse sectional view in the plane of line 27—27 on Figure 26;

Figure 28 is a top plan view as observed in the plane of broken line 28—28 on Figure 27;

Figure 29 is a diagrammatic illustration of the steam supply system and exhaust manifold;

Figure 30 is a graphic illustration of the performance characteristics of the steam type engine;

Figure 31 is illustrative of a slotless catapult for the engines of either the combustion or steam type;

Figure 32 is a block diagram arrangement of one form of ignition control system;

Figure 33 is a block diagram for a second form of ignition control system; incorporating preventive over speed control;

Figure 34 is a diagrammatic view of the general arrangement of the launching means.

Figure 1:
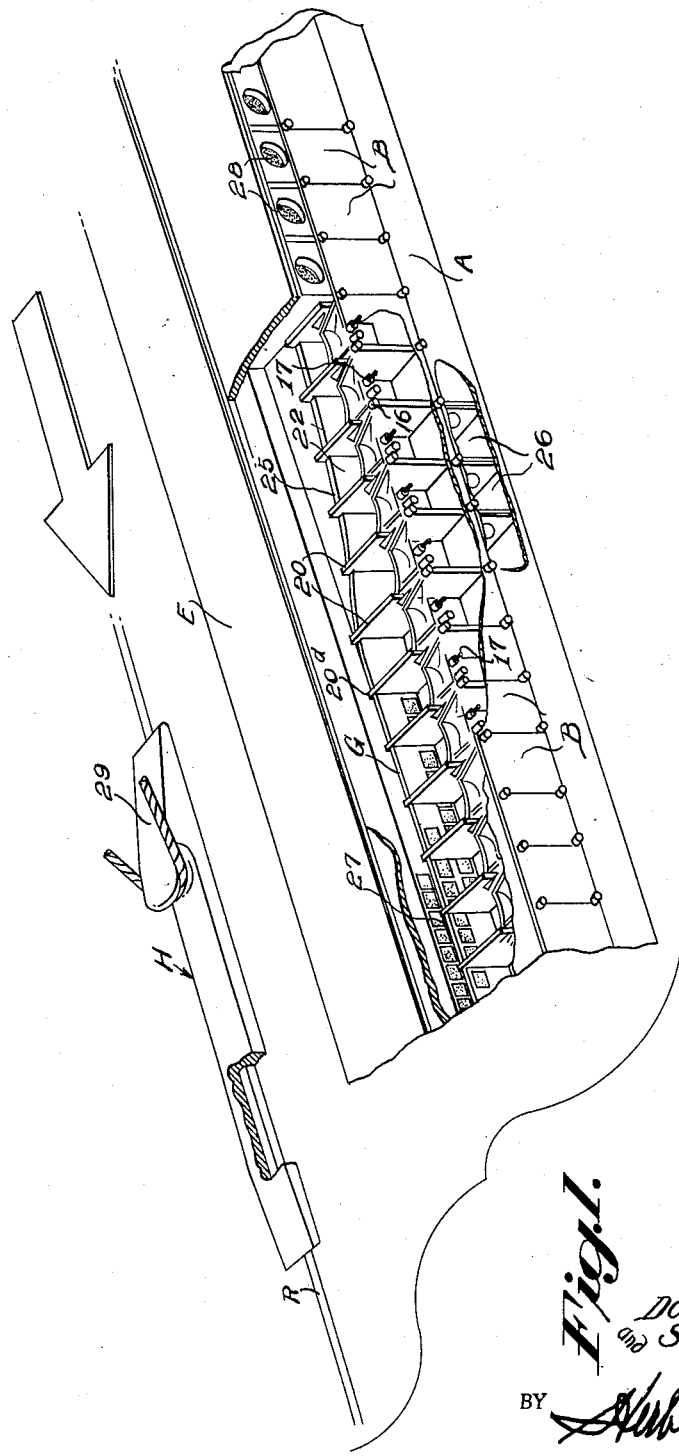

Generally the present invention comprises an elongated housing A formed of a plurality of preformed units B, see Figures 1a, 2 and 2a. The units are secured together in alignment in spaced parallel rows C and D along each side of the housing A, which includes top and bottom plates E and F. Each unit of the internal combustion type, shown in Figures 1, 2 and 2a includes a dome or head 15 which mounts the fuel injector 16 and the ignition means 17 with rectangular recesses 18 and 19 and a gas scavenging duct 19a formed in the unit casting on each side of the dome 15 and in each of which are movably mounted walls or vanes 20 adapted to extend laterally into the space between the rows C and D. These walls cooperate to form expansion chambers 22 when a curved side face of a cam G moves along between the rows C and D and engages the free ends 23 of the walls or vanes 20. The inner edges of the vanes 20 are maintained in close contact with the lateral walls of cam G and suitable means are provided for returning such vanes after having been pushed laterally outwardly by cam G, and which may comprise a groove 20a in each opposite side of the cam (Figures 1a, 12 and 28), in which are disposed sliding members 20b, and the said vanes are provided with overhanging portions 20c, which are pivotally connected to said members 20b as at 20d.

The cam G may be formed for single cycle operation as in Figures 1 and 1a or for multiple cycle operation as illustrated in Figure 15, hereafter referred to in detail. The single cycle cam comprises opposed curved faces 24 and 25 (Figure 1a) to provide an elliptical formation, whereby there is a central high portion on each side tapering or falling off progressively to a final absolute low portion, which provides for intake and exhaust of one cycle and then intake for the start of the next cycle. These progressive high to low portions provide for the thrust transfer to the cam, as illustrated in Figure 4, for internal combustion operation. For example, the cam when positioned as in Figure 1 or in Figure 4 creates chambers $22^1$, $22^2$, $22^3$, $22^4$, $22^5$, $22^6$, $22^7$, $22^8$, $22^9$, $22^{10}$, $22^{11}$, and $22^{12}$.

At the start of a cycle the cam G is given a forward boost as will be explained fully hereinafter in connection with Figure 15 in connection with the tandem embodiment of cams. Each cam is formed at its narrow or low point end with aligned groups of air inlet channels 27, an air intake manifold 27a, and controlled exhaust channels 28 to exhaust ports 28a, see Figures 2a and 12, while the cam face of the central high point is solid, see sectional Figures 6, 7, 8 and 9 for examples of the respective low and high points. Fuel is supplied through fuel intake manifold 38 to injectors 16, see Figure 10.

The shuttle H (Figures 15, 17, 18, 19 and 20), may comprise a bridle hook 29, a dolly 30 with guide wheels 31 for engagement with the underside of track rails 32 mounted in the top plate E of the housing A (Figure 20). The dolly 30 may be coupled to the cam G by suitable releasable means pivotally connected to cam G by a slotted lug 33 and a pin 34 as shown in Figure 3, or it may be pushed by the front portion of the cam, if desired. Thus basically the operation of the engine results in forward travel of the cam G with the shuttle H and air is brought into the opposed aligned chambers $22^1$, $22^2$, $22^3$, $22^4$ and $22^5$ through said super charging channels 27. The air is compressed by the configuration of the cam faces 24 and 25, which cam faces also retract the walls or vanes 20. Fuel is injected to the compressed air in the chamber $22^6$ and the same is ignited by the spark plug 17. As the cam continues to move forward the ignited gases expand in chambers $22^7$, $22^8$, $22^9$, $22^{10}$, $22^{11}$ and $22^{12}$. Then the cam G and the shuttle H are moved forward by the ignition of the gases, and gases are discharged through exhaust ports 28a as the vanes 20 move to open same in the housing A for exhausting the chambers at the after reduced portions of the cam.

This engine may be supercharged by the supply of high pressure air into the compression chambers during the cam stroke, see Figure 10, for the general diagrammatic illustration of the fuel system.

The system comprises a fuel pump 36 having a connection 37 with a fuel supply, and which pump feeds the fuel manifold 38 to the fuel injectors 16, an air supply 39, to an air compressor 40 connected to the air supply manifold 27a and leading into the respective chambers through the intake channels 27 therefor, see Figure 2a. This is a dual supply and is duplicated on the opposite side of the housing A to the chambers on said opposite side.

The foregoing description has illustrated and described a single cycle or single cam linear engine, but it may be preferable to use multiple tandem cams, to thereby provide a two or more cycle linear engine as hereinafter described in connection with a second embodiment of this invention. Referring specifically to Figures 11, 12 and 13, there is shown a similar housing A' formed of units B' secured together in spaced parallel rows C' and D' along each side of the housing as in embodiment one. The housing A' of the second embodiment also includes the top plate E' and bottom plate or base F' and includes the dome or heads 15', fuel injectors 16', ignition means 17' with the vane recesses 18', the scavenger duct 19ᵃ, and the chamber forming vanes 20' as described in embodiment one. The principal difference of embodiment two resides in the cam G' which comprises, for example, a two or more cycle arrangement, formed by a number of cams, G¹, G², G³ and G⁴ used in tandem. Each chamber will deliver as many power strokes as there are cams.

The structural features of the housing and the component units and the working parts therein of the second embodiment are substantially identical to embodiment one. Therefore a detailed description of the different structural features only, such as the tandem cam means and the operation plus the water brake probe P engageable in a water cylinder, the starting means S, and a few additional details should suffice to describe the second embodiment to others skilled in the art, see Figure 15 for a general layout of this embodiment.

In embodiment two, the housing A' is comprised of a greater number of units B' joined together and includes the tandem cams G¹, G², G³ and G⁴, as shown in Figures 11, 12 and 15. Also, the shuttle H' is basically the same except that it is mounted to travel along the track in the top plate E over a sealing strip R, which normally seals the track space and protects the combustion chamber below the track from foreign matter or the like. This strip is not subjected to any pressure, see Figures 18 to 22, wherein it will be seen that strip R is normally snapped into grooves 32ᵃ in track rail 32 and the shuttle H' is provided with a channel 30ᵃ which receives and temporarily retracts the strip R from its normal position in Figure 21, and replaces same after shuttle has passed.

The general operation of the tandem cam equipped engine is much like the single cam engine. Air from the supercharge manifold 27ᵃ, Figure 10, is supplied to the engine chamber 22' through ports 27ᵃ' in the low part of the cams G', G², etc. The rising part of the cams have no ports. The air in the chambers 22' is compressed as the rising part of the cam passes, and at approximately top dead center, see Figure 1ᵃ, fuel injection is started through fuel intake manifold 38 (Figure 10) and ignition is applied to igniting means 16 by way of ignition switches SW energized from a high voltage source or spark transformer, see Figure 32.

During the passage of the gradually falling part of the cam, which also contains no ports, burning continues until the excess of air is used up. The fuel injection rate may be so arranged and timed that a burning at the constant pressure of a semi-diesel type cycle is maintained. It is believed that this type of cycle will result in very high mean effective pressures and reliable firing without preheating.

After burning or ignition is complete, the hot gases are expanded in the trailing chambers 22⁷ to 22¹², until the low part of the cam is reached, see Figure 4. Then the exhaust ports 28ᵃ are uncovered as the low point is reached, to thereby allow the expanded gas to escape. As these chambers 22⁷—22¹² approach supercharge pressure, intake ports 27' in the low part of the cam are uncovered and, with both intake and exhaust ports 28' and 27' respectively open, these chambers are scavenged of burned gas. As the cam continues to move, the intake ports remain open, but the exhaust ports will be closed, said intake ports remaining open to permit a new charge of air to be forced into the next chambers for the next cycle.

The time and the maximum velocity of the catapult determine the length of the straight port section between cams G', G², G³, and G⁴.

The starting and stopping operations of the linear engine or catapult are illustrated in Figure 13 and in the starting operation the following actions take place. Air pressure is admitted into chamber 50 through the line 50ᵃ. Valving operated by the sliding cylinder wall switches, similar to those used for ignition and fuel injection, determines the proper timing and ports for compressed air to pass through line 51 and into the chamber 51ᵃ. This causes the piston 52 to move back into chamber 52ᵃ, thus opening the valve 53. Air displaced by the movement of piston 52 in chamber 52ᵃ is discharged to atmosphere through the line 53ᵃ. When the valve 53 is opened in this manner, the compressed air in chamber 50 is allowed to enter the chamber 54. The chamber 54 is the normal compression cylinder for the catapult, and when compressed air is admitted as above on the down side of the cam G, it is propelled forwardly to start the compression and ignition operation.

In the braking operation of the linear engine or catapult, air at a predetermined pressure is induced into the chamber 50 through the line 50ᵃ, which holds the valve 53 closed. No pressure is induced in chamber 51ᵃ in this case. As the cam G enters the braking area, it continues to compress air in the compressing chamber or cylinder 54 because of its configuration and forward motion. When the air in chamber 54 is compressed to a higher p.s.i. than the predetermined pressure in chamber 50, the valve 53 is forced open and the higher pressure is transmitted back through chamber 50 and line 50ᵃ to the main accumulator 74. The work required to do this results in a braking force upon the main cam G and thereby applies the deceleration loads required to stop the forward motion of the cam G. It is at this point to be noted that identical components comprise both the starting and the braking areas, thus it is a selective process as to which end of the stroke is used for starting and which for braking, which results in a unidirectional device. It is to be further noted that no ignition of fuel injection is provided in the starting and braking areas.

At the end of the stroke, a similar action stops the shuttle and the cams in the same manner as the original start. If necessary, internal combustion may be used to speed the return stroke, but because the porting will be in reverse, the combustion will be without supercharge. At battery, the starting system stops the shuttle and cams.

Timing is accomplished through the vane actuated ignition switches SW for each engine chamber, as it reaches near top dead center, see Figures 1ᵃ and 32. The actual ignition will be accomplished by a spark plug and a high intensity ignition system, one form being illustrated by block diagram in Figure 32. The fuel injection as above explained is by injectors 16 using a high pressure fuel pump and high pressure air for atomization and the fuel is timed by a valve actuated by the moving vane near top dead center of the cam high point as previously explained.

Also in Figure 32 is illustrated a speed sensing circuit 55 tied into the ignition system 56 to prevent a runaway shot. For example, the speed may be preset at 57 and when the preset speed is exceeded, the control phase 57 varies with the actual velocity phase and an error signal is generated in the error measurement means, which will cut off the spark and stop the ignition operation.

In Figure 33 is disclosed a second arrangement of overshot control using a motor driven switch 60 and actual velocity stroke responsive means 61, a pre-set velocity stroke means 62, each leading to a two phase motor or the like 63, which when the phases are alike remains inoperative, but when they become out of phase will give an output by shaft 64 to drive an overspeed motor to cut off the drive to the motor driven ignition switch 60. Such follow up and error control systems are well known in the remote control of valves, motors and the like and therefore the actual structural details of the units in system are not believed necessary.

A third embodiment of the invention is disclosed in Figures 26, 27, and 28, which is of the same general construction as the above described second embodiment, but wherein a power medium in the form of steam is utilized instead of the combustible medium utilized in the second embodiment.

The cam Gˢ and variable capacity chambers 22ᵃ correspond to that of the second embodiment, and the essential difference between the structure of the second embodiment and that of the third embodiment is in the provision of a pair of steam manifolds 65 (Figure 26), intake steam ports 66, exhaust ports 67 and inlet port control valves 68 which are operable by cams 69 projecting from opposite sides of the chamber control main cam $G^s$ and each side of the housing is provided with a valve lock mechanism 70. The chamber forming vanes in this embodiment are designated 20A.

A safety feature is involved in this steam type catapult which prevents runaway catapult shots by cutting off the steam supply to each individual unit. This cut-off at each unit reduces the time lag to stop the cam to practically nothing as it is immediately adjacent to the expansion chamber.

With reference to Figure 27 in this connection, it will be seen that the valve 68 is fixed to a cylindrical member $68^a$ which is backed by a spring $68^b$ and through which the valve stem $68^c$ has free sliding movement. The member $68^a$ is provided with a slot $68^d$ and a lock pin $68^e$ is provided for alternate positions, one of which is as shown in Figure 27 and the other of which is in the slot $68^d$.

When the pin $68^e$ is in slot $68^d$, stem $68^c$ can be depressed by cam 69 without opening of valve 68. If the valve does not open, no steam is injected and the shuttle carrying cam is no longer accelerated.

The rotation of the lock pin is accomplished externally of the engine by multiple interconnected valve intake lock arms which are actuated when a stop is desired.

The diagrammatic view in Figure 29 corresponds to that of Figure 10, but discloses the system wherein steam is utilized as the power medium.

The diagrammatic illustration in Figure 5 is similar to that in Figure 4, the former of which relates to the internal combustion engine and the latter of which relates to the steam engine and from which figures it will be apparent that the operation is substantially the same in the two forms.

In Figure 14 is disclosed a safety feature for the catapult, which is a means to prevent runaway catapult shots by cutting off the intake air supply necessary for combustion.

As indicated, such means comprises an accumulator or manifold 74 from which the intake air supply enters the intake control valve $74^a$ through the port 75.

The intake air supply in the manifold accumulator 74 enters the intake control valve $74^a$ of the unit through port 75; located in port 75 is a remotely operated lever 77 to open and close valve $74^a$. A valve of this type is located in each port 75 for the full length of the catapult with the exception of the starting and braking areas at each end. These valves are normally open; however, in the event an emergency stop is required, they are all closed remotely by lever 77. This cuts off the supply of air required for combustion. Without the complete combustion cycle, the cam is no longer accelerated and comes to a halt. This feature is also shown on Figure 22. When this is done the cam may be used to arrest an object such as aircraft engaged with the shuttle 80, see Figure 31.

*Super charged air supply*

Super charged air is supplied through the manifold accumulator 74 as shown on Figure 14 and passes through port 75 (Figure 14). It is retained in the manifold by the valves 76. An actuating surface cam $54^a$ is along the center line of the main cam body G that forces the valves open when it is in contact with the actuating stem $76^a$ of the valve 76. This allows the supercharged air to pass into the intake ports on the main cam G, only at the points where the main cam G is in a position to use the air. All valves ahead of and behind the main cam G remain closed and prevent leakage of the air over the entire length of the catapult. Each unit assembly houses one valve so that each unit functions independently of the others.

In Figures 23 and 24 the starting and braking actions respectively are diagrammatically illustrated, and from the legends and explanatory notes on said figures, such starting and braking actions are believed to be clear.

In Figure 25 is graphically illustrated the performance of the internal combustion type catapult in accordance with the second embodiment of the invention.

In Figure 30 is graphically illustrated the performance of the steam type catapult in accordance with the third embodiment of the invention.

In Figure 31 is disclosed a catapult which may be either of the internal combustion or steam type, and may be of the same construction as hereinbefore described with the exception that the housing $A^3$ is not provided with the shuttle receiving slot which may be found advantageous in the exclusion of weather elements to the mechanism within the housing.

Accordingly a cable 78 has opposite ends thereof connected to opposite ends of the cam G, and the cable is disposed around sheaves 79 mounted on a suitable surface, and a bridle engageable shuttle 80 is secured to a longitudinal reach 81 of the cable, which is disposed in spaced parallel relation to the housing $A^3$.

In Figure 34 is disclosed the general arrangement of the engine, and wherein each end of the housing A is provided with a braking and starting area a and a', and wherein the mechanisms of Figures 13, 14 and 22 are disposed.

As indicated, the launching stroke is in the direction of arrow $a^3$, but since the cam may be power driven in its return from a final launching position, the starting and braking means are preferably disposed at each end of the housing.

While the invention has been disclosed in accordance with certain specific structural embodiments thereof, such are to be considered as illustrative only and not restrictive, the scope of the invention being defined in the subjoined claims.

What is claimed is:

1. A linear engine comprising an elongated housing, said housing being divided into chambers adapted to receive air and fuel from an air intake manifold and a fuel intake manifold, intake ports and exhaust ports for each chamber, an igniting member and a fuel injector nozzle in each chamber, each of said chambers having walls laterally movable in recesses formed in the housing, a cam means linearly movable along the housing, and means responsive to the movement of said cam means for controlling the air and fuel intake parts, ignition, compression and the ports for exhaust of gases from said chambers, and means driven by said cam.

2. The liner engine described in claim 1, wherein the cam means is formed with a solid high portion and two low portions, one at each end progressively falling from said high portion, said low portions each having and exhaust openings arranged therein for cooperation with the firing, compression and exhaust strokes of the cam as it traverses the said housing.

3. The linear engine described in claim 1, wherein the said cam means is comprised of two or more cams in tandem, to thereby provide at least a two cycle engine.

4. The linear engine described in claim 1, wherein the said cam driven means comprises a track guided shuttle with a bridle hook.

5. The linear engine described in claim 1, wherein the said housing is formed with a central elongated space with said chambers being aligned along each side thereof, and a guide way formed along the inner face of the said spaced apart chamber walls adapted to receive a projected part of the said cam means as the same is propelled along the same by compressive forces resulting from the expansion of gases in the adjacent chambers.

6. Means for launching aircraft comprising a guide housing, fluid compressing areas therein, a cam having fluid intake and exhaust ports, said cam having opposed convex side walls so as to be projected forward by compression of charges entering the cam intake ports in the housing adjacent a part of the cam, means carried by the cam adapted to control the said ports for intake and exhaust during projection of the cam, and means for starting the compression action, to thereby project the said cam.

7. Means for launching aircraft as described in claim 1, wherein the cam is almond-shaped.

8. Means for launching aircraft as described in claim 1, wherein the cam engages movable vane members, said members providing a plurality of fluid compression chambers cooperating to project the said cam.

9. Means for launching aircraft, comprising an elongated cam member supported within a housing for movement longitudinally thereof, a succession of variable capacity fluid chambers disposed within said housing laterally of said cam member, said cam member having a convex side wall opposed to said chambers and closing corresponding sides of all of such chambers within the length of said convex wall, and fluid inlet and exhaust ports controlled by said cam, whereby fluid is gradually compressed in successive chambers at the advance end of said cam member and the compressed fluid is free to expand in successive chambers at the rear of said cam member for advancing same through said housing.

10. The structure according to claim 9, wherein said ports are formed in said cam member and said housing.

11. The structure according to claim 9, wherein said cam member is provided with a second convex side wall in opposition to said first side wall, a succession of variable capacity fluid chambers opposing said second side wall, and fluid inlet and exhaust ports for said last chambers controlled by said cam member.

12. The structure according to claim 9, wherein said cam member is provided with a plurality of pairs of laterally opposed convex walls for cooperation with corresponding variable capacity fluid chambers within said housing.

13. The structure according to claim 9, wherein said housing is provided with a plurality of longitudinally spaced and laterally disposed slots, a plurality of vanes having corresponding edge portions thereof slidably disposed in said slots and forming side walls of said chambers, and a longitudinal slidable connection between said cam convex wall and adjacent edges of said vanes, whereby said vanes move in correspondence with the curvature of said convex wall.

14. The structure according to claim 13, wherein said slidable connection comprises a groove extending along the upper edge of said convex wall, said vanes each having a projection overlying said groove, and means slidably disposed within said groove and being pivotally connected to said projections.

15. The structure according to claim 9, wherein said housing comprises a top wall having a longitudinal guide slot therein, a shuttle disposed within said housing in advance of said cam member for longitudinal movement therein, said shuttle having a portion extending through said slot and being provided with an aircraft bridle engaging hook, and means for effecting longitudinal movement of the shuttle through corresponding movement of the cam member.

16. The structure according to claim 15, wherein said means for effecting longitudinal movement of the shuttle comprises a pin and slot pivotal connection between the shuttle and the cam member.

17. The structure according to claim 15, wherein said shuttle comprises a carriage having wheels engageable with said housing, said carriage including a neck extending through said guide slot and a portion at the outer end of said neck disposed above said guide slot and having a bridle engaging hook thereon.

18. The structure according to claim 17, wherein a flexible closure strip extends longitudinally of said guide slot with opposite edges thereof normally interlocked with opposite side walls of the guide slot, and said portion of said shuttle at the outer end of said neck being provided with a slot through which said closure strip is threaded for temporary removal of same upon passage of the shuttle through the housing and for replacing same after the shuttle has passed.

19. The structure according to claim 9, wherein said housing is provided with braking and starting mechanism at each end thereof.

20. The structure according to claim 19, wherein said mechanism comprises fluid operable brake means, a fluid supply conduit for said brake means, and a main fluid supply conduit.

21. The structure according to claim 9, wherein said housing is provided with a solid top plate, a cable having opposite ends thereof disposed within said housing and connected to opposite ends of said cam member, said cable being disposed in generally rectangular formation with one reach thereof disposed in spaced parallel relation to said housing, and a shuttle disposed within said cable reach.

22. The structure according to claim 21, together with a guide sheave disposed within each corner of said rectangularly disposed cable.

23. A linear engine comprising an elongated housing, an elongated cam member disposed within said housing for movement longitudinally thereof and having a convex side wall, variable capacity steam chambers in said housing with said convex side wall closing corresponding sides thereof, steam intake and exhaust ports in said housing and said cam member, valves controlling said inlet ports and means supported by said cam member operable to open said valves upon movement of the cam member.

24. The structure according to claim 23, together with mechanism for locking said valves.

25. The structure according to claim 23, wherein opposed walls of said chambers are slidably supported in said housing and said walls having a sliding connection with said convex side wall of the cam member.

26. In a linear engine having an elongated casing, a guideway therein, laterally reciprocal vanes mounted in the casing on each side of the guideway forming pressure chambers, inlet and outlet ports for said chambers, a main cam for actuating said vanes, an air supply manifold extending the length of said casing, a plurality of longitudinally spaced openings in said air supply manifold, a manually controlled valve for each opening, and a connection for supplying air therefrom into each of the said chambers, each of said connections having a valve seat and valve therefor, said main cam having a cam surface adapted to open said valves in the said connections, and manual means adapted to open or close said manifold valves to supply air under pressure to said chambers when said additional cam surface of the main cam opens the valves in each respective connection or to serve as a brake when said manual means is moved to valve closing position.

27. The structure described in claim 26, wherein the said main cam is adapted to project a shuttle with a bridle hook along said guideway, a cable connected to said shuttle at each end and looped around sheaves supported adjacent the casing, whereby a mobile object connected or engaging said shuttle or cable may be decelerated upon closing said air supply valve means by said manual means, said manual means comprising a control lever.

28. In a linear engine having compression chambers of the type described with a main cam control, and a braking control pilot valve, means for starting said engine comprising a compressed air source, an auxiliary cam surface carried by said main cam control, a manifold for supplying said compressed air and spaced valve means adapted to release air therefrom in timed sequence in coaction with said pilot valve, said main cam having inlet ports therein permitting said compressed air to enter therethrough and into the compression chambers of said engine.

References Cited in the file of this patent

UNITED STATES PATENTS

| | | |
|---|---|---|
| 2,703,211 | Hinchman et al. | Mar. 1, 1955 |
| 2,799,988 | Larrecq et al. | July 23, 1957 |